United States Patent Office 3,072,525
Patented Jan. 8, 1963

3,072,525
FUNGICIDAL COMPOSITION COMPRISING A SALICYLATE AND A PYRAZOLE
Horst Neumann, Ludwigshafen (Rhine), Germany, assignor to Knoll A.-G. Chemische Fabriken, Ludwigshafen (Rhine), Germany, a corporation of Germany
No Drawing. Filed Aug. 6, 1959, Ser. No. 831,940
Claims priority, application Germany Aug. 9, 1958
5 Claims. (Cl. 167—31)

The present invention relates to a highly effective fungicidal composition and more particularly to a fungicidal composition containing, as active ingredients, salicylic acid esters and other fungicidal agents.

It is one object of the present invention to provide a new and highly effective fungicidal composition which comprises, in combination, salicylic acid esters and other antifungal agents and wherein such a combination produces a surprisingly high synergistic effect.

Another object of the present invention is to provide highly effective antifungal compositions for combatting fungi pathogenic to plants.

A further object of the present invention is to provide highly effective disinfectant compositions to be used for many purposes.

Other objects of the present invention and advantageous features thereof will become apparent as the description proceeds.

According to the present invention it has been found that the combination of salicylic acid esters with other antifungal compounds, such as salicylic acid anilide, esters of p-hydroxy benzoic acid, or, preferably, antifungal hydroxy phenyl pyrazole compounds, produces a noteworthy increase in antifungal activity which increase is due to a surprising synergistic effect.

According to Walter and Heilmeyer, "Antibiotika-Fibel," published by Georg Thieme Verlag, Stuttgart, 1954, and "Webster's New International Dictionary," published by G. C. Merriam Co., Springfield, Mass., 2nd. ed., 1948 the term "synergism" is defined as the "cooperative action of discrete agencies such that the total effect is greater than the sum of the two effects taken independently." According to Marwyk, "Zeitschrift fuer Hygiene," vol. 144, p. 477 (1958), who quotes from the literature, synergism is defined as "any of the combined doses being smaller than its half minimum inhibiting dose."

While esters of salicylic acid per se exert only a small antimycotic effect, their combination with the fungicidal compounds mentioned above yields compositions which even in high dilution, have a surprisingly high effect against a large number of fungi, especially against fungi affecting plants, dead organic matter, and animals.

Esters of salicylic acid which are useful in compositions according to the present invention are esters with low molecular aliphatic alcohols and glycols such as they are obtained by the addition of one or more moles of ethylene oxide to salicylic acid, as well as esters with phenols.

Preferred fungicidal hydroxy phenols pyrazole compounds are, for instance:

3-(2-hydroxy phenyl) pyrazole,
3-(2-hydroxy-5-chloro phenyl) pyrazole,
3-(2-hydroxy-4-chloro phenyl) pyrazole,
3-(2-hydroxy-5-bromo phenyl)-5-methyl pyrazole, and others.

Of fungicidal esters of p-hydroxy benzoic acid, especially the esters with lower aliphatic alcohols with an alkyl chain of 1 to 4 carbon atoms may be used.

The compositions according to the present invention have proved to be especially effective in combatting fungi pathogenic to plants such as Claviceps purpurea, Gnomonia erythrostoma, Sphaceloma ampelinum, Coniothyrium diplodiella, Phytium de Baryanum, Cenagium abietis, Cephalosporium acremonium, Hemispora stellata, Penicillium spinolosum, Penicillium notatum, and others.

Although the compositions according to the present invention are especially valuable against plant-pathogenic fungi, they are not limited thereto, but can be used in combating any kind of fungus infection or attack. They may, for instance, be used as disinfectants in swimming pools, shower baths, mining installations, for cleaning wooden gratings, board-walks, as an additive to soap and detergents used for the disinfection of articles of daily use, such as linen, pottery, earthenware, porcelain articles, rubber shoes, hospital equipment as well as for the control of pathogenic germs in rooms. For the last mentioned purpose the composition may be incorporated into agents used for the maintenance and care of floors, walls, etc., such as floor polishing waxes.

Due to their effectiveness against plant pathogenic fungi the compositions according to the present invention can also effectively be used against fungus diseases of grain, grapevine, cherry trees, firs, pines and others. They are, furthermore, useful for protecting wine barrels, wine cellars, food stocks, textiles, and the like against fungal attacks.

The high penetrating power of the new compositions is of special value in their use as disinfectants, preservatives, and fungicidal agents for combating plant-pathogenic fungi.

The present invention and the synergistic effect of the new combination are illustrated by the following comparative tests. Tables I and II show the results obtained by using various compositions on *Trichophyton gypseum*, and Tables III and IV show the results obtained by the action of a composition consisting of methyl salicylate and 3-(2-hydroxy-5-chloro phenyl) pyrazole on various plant-pathogenic fungi.

The values given in Tables I and II show the minimum inhibitory concentration of each compound and the concentration of the combination of the antifungal agents which cause complete inhibition of growth. The tables show that, when using less than 50% of the minimum inhibitory concentration of the salicylic acid ester and less than 50% of the minimum inhibitory concentration of the other fungicidal component, complete inhibition of growth of the test germ *Trichophyton gypseum* is achieved.

TABLE I

Test Tube Dilution Test

[Observation time: 21 days]

| Test No. | Test compound | Nutrient medium¹ | Complete inhibition of growth in a concentration of 1:— | Percent of the minimum inhibitory concentration |
|---|---|---|---|---|
| 1 | Methyl salicylate | B | 3,000 | 100 |
| 2 | 3-(2-hydroxy-5-chloro phenyl) pyrazole. | B | 200,000 | 100 |
| 3 | Combination of methyl salicylate and 3-(2-hydroxy-5-chloro phenyl) pyrazole | B | 10,000 2,000,000 | 33.3 10.0 |
| 4 | Ethyl salicylate | A | 4,600 | 100 |
| 5 | Salicylic acid anilide | A | 64,000 | 100 |
| 6 | Combination of ethyl salicylate and salicylic acid anilide | A | 20,480 256,000 | 22 25 |
| 7 | n-Propyl salicylate | B | 10,000 | 100 |
| 8 | Methyl ester of p-hydroxy benzoic acid | B | 2,500 | 100 |
| 9 | Combination of n-propyl salicylate and methyl ester of p-hydroxy benzoic acid | B | 40,000 125,000 | 25 2 |
| 10 | n-propyl salicylate | A | 2,400 | 100 |
| 11 | Methyl ester of p-hydroxy benzoic acid | A | 2,000 | 100 |

TABLE I—Continued
Test Tube Dilution Test—Continued

| Test No. | Test compound | Nutrient medium[1] | Complete inhibition of growth in a concentration of 1:— | Percent of the minimum inhibitory concentration |
|---|---|---|---|---|
| 12 | Combination of n-propyl salicylate and methyl ester of p-hydroxy benzoic acid | A | 20,480 256,000 | 12 0.8 |
| 13 | n-butyl salicylate | B | 1,000 | 100 |
| 14 | Salicylic acid anilide | B | 50,000 | 100 |
| 15 | Combination of n-butyl salicylate and salicylic acid anilide | B | 2,500 1,000,000 | 40 5 |
| 16 | ___do___ | B | 5,000 500,000 | 20 10 |
| 17 | n-Butyl salicylate | A | 800 | 100 |
| 18 | Salicylic acid anilide | A | 64,000 | 100 |
| 19 | Combination of n-butyl salicylate and salicylic acid anilide | A | 10,240 130,000 | 8 49 |
| 20 | Phenyl salicylate | B | 8,000 | 100 |
| 21 | 3 - (2 - hydroxy - 5 - chloro phenyl) pyrazole | B | 200,000 | 100 |
| 22 | Combination of phenyl salicylate and 3-(2-hydroxy-5-chloro phenyl) pyrazole | B | 20,000 1,000,000 | 40 20 |
| 23 | ___do___ | B | 40,000 500,000 | 20 40 |

[1] Nutrient medium A: Bacto-Sabouraud maltose agar (Difco.). Nutrient medium B: Standard I nutrient bouillon Merck 25.0 parts, agar 25.0 parts, glucose 10.0 parts, glycerol 5.0 parts, distilled water ad 1,000 cc.

As is evident from the tests of Table I, the fungicidal effect of the antifungal compounds used in said tests is increased considerably by a combination with salicylic acid esters regardless what nutrient medium is used. As a result of such a combination synergistic effects are achieved as they have not been observed heretofore.

The new active compositions according to the present invention are furthermore characterized by a remarkably stable intensity of activity under practical conditions of use, even in the presence of protein, as well as by a noteworthy power of diffusion. Ordinarily fungicidal agents are substantially completely inactivated by solutions containing 5% of protein. In contrast thereto the active compositions according to the present invention retain their activity and their synergistic effect in the presence of protein as is evident from the tests shown in the following Table II.

TABLE II
Test Tube Dilution Test With the Addition of 5% of Bovine Serum
[Test period: 21 days]

| Test No. | Test compound | Nutrient medium[1] | Complete inhibition of growth in a concentration of 1:— | Percent of the minimum inhibitory concentration |
|---|---|---|---|---|
| 24 | Methyl salicylate | B | 3,000 | 100 |
| 25 | 3 - (2 - hydroxy - 5 - chloro phenyl) pyrazole | B | 200,000 | 100 |
| 26 | Combination of methyl salicylate and 3-(2-hydroxy-5-chloro phenyl) pyrazole | B | 10,000 2,000,000 | 33.3 10 |
| 27 | n-Propyl salicylate | B | 6,000 | 100 |
| 28 | Methyl ester of p-hydroxy benzoic acid | B | 2,500 | 100 |
| 29 | Combination of n-propyl salicylate and methyl ester of p-hydroxy benzoic acid | B | 40,000 125,000 | 15 2 |
| 30 | n-Butyl salicylate | B | 700 | 100 |
| 31 | Salicylic acid anilide | B | <50,000 | 100 |
| 32 | Combination of n-butyl salicylate and salicylic acid anilide | B | 2,500 1,000,000 | 28 <5 |
| 33 | ___do___ | B | 5,000 500,000 | 14 <10 |
| 34 | Phenyl salicylate | B | 8,000 | 100 |
| 35 | 3 - (2 - hydroxy - 5 - chloro phenyl) pyrazole | B | 200,000 | 100 |
| 36 | Combination of phenyl salicylate and 3-(2-hydroxy-5-chloro phenyl) pyrazole | B | 20,000 1,000,000 | 40 20 |

[1] See footnote 1, Table I.

The results of both Tables I and II prove that combinations of 3-(2-hydroxy-5-chloro phenyl) pyrazole with esters of salicylic acid are highly effective.

The following Tables III and IV show the effect of such combination against fungi which are pathogenic to plants and attack dead organic material. The test methods used are the same as described for Tables I and II.

TABLE III
Test Tube Dilution Tests With Various Fungi
[Observation period: 21 days]

| Test compound | Test fungus | Nutrient medium[1] | Complete inhibition of growth in a concentration of 1:— | Percent of the minimum inhibitory concentration |
|---|---|---|---|---|
| Methyl salicylate | Claviceps purpurea | C | 3,000 | 100 |
| 3-(2-hydroxy-5-chloro phenyl) pyrazole | Claviceps purpurea | C | 25,000 | 100 |
| Combination of methyl salicylate and 3-(2-hydroxy-5-chloro phenyl) pyrazole | Claviceps purpurea | C | 10,000 100,000 | 33.3 25 |
| Methyl salicylate | Gnomonia erythrostoma | D | 3,000 | 100 |
| 3-(2-hydroxy-5-chloro phenyl) pyrazole | Gnomonia erythrostoma | D | 25,000 | 100 |
| Combination of methyl salicylate and 3-(2-hydroxy-5-chloro phenyl) pyrazole | Gnomonia erythrostoma | D | 50,000 60,000 | About 6 About 42 |
| Methyl salicylate | Sphaceloma ampelinum | D | 4,000 | 100 |
| 3-(2-hydroxy-5-chloro phenyl) pyrazole | Sphaceloma ampelinum | D | 25,000 | 100 |
| Combination of methyl salicylate and 3-(2-hydroxy-5-chloro phenyl) pyrazole | Sphaceloma ampelinum | D | 40,000 60,000 | 10 About 42 |
| Methyl salicylate | Coniothyrium diplodiella | D | 5,000 | 100 |
| 3-(2-hydroxy-5-chloro phenyl) pyrazole | Coniothyrium diplodiella | D | 25,000 | 100 |
| Combination of methyl salicylate and 3-(2-hydroxy-5-chloro phenyl) pyrazole | Coniothyrium diplodiella | D | 50,000 60,000 | 10 About 42 |
| Methyl salicylate | Phytium de baryanum | D | 4,000 | 100 |
| 3-(2-hydroxy-5-chloro phenyl) pyrazole | Phytium de borianum | D | 10,000 | 100 |
| Combination of methyl salicylate and 3-(2-hydroxy-5-chloro phenyl) pyrazole | Phytium de barianum | D | 10,000 25,000 | 40 40 |
| Methyl salicylate | Cenangium abietis | C | 4,000 | 100 |
| 3-(2-hydroxy-5-chloro phenyl) pyrazole | Cenangium abietis | C | 10,000 | 100 |
| Combination of methyl salicylate and 3-(2-hydroxy-5-chloro phenyl) pyrazole | Cenangium abietis | C | 50,000 50,000 | 8 20 |

TABLE III—Continued

Test Tube Dilution Tests, Etc.—Continued

| Test compound | Test fungus | Nutrient medium [1] | Complete inhibition of growth in a concentration of 1:— | Percent of the minimum inhibitory concentration |
|---|---|---|---|---|
| Methyl salicylate | Cephalosporium acremonium | C | 1,000 | 100 |
| 3-(2-hydroxy-5-chloro phenyl) pyrazole | Cephalosporium acremonium | C | 10,000 | 100 |
| Combination of methyl salicylate and 3-(2-hydroxy-5-chloro phenyl) pyrazole. | Cephalosporium acremonium | C | 10,000 25,000 | 10 40 |
| Methyl salicylate | Hemispora stellata | C | 5,000 | 100 |
| 3-(2-hydroxy-5-chloro phenyl) pyrazole | Hemispora stellata | C | 25,000 | 100 |
| Combination of methyl salicylate and 3-(2-hydroxy-5-chloro phenyl pyrazole. | Hemispora stellata | C | 12,000 100,000 | About 42 25 |
| Methyl salicylate | Penicillium spinolosum | A | 2,600 | 100 |
| 3-(2-hydroxy-5-chloro phenyl) pyrazole | Penicillium spinolosum | A | 25,000 | 100 |
| Combination of methyl salicylate and 3-(2-hydroxy-5-chloro phenyl) pyrazole. | Penicillium spinolosum | A | 10,000 60,000 | 20 About 42 |
| Methyl salicylate | Penicillium notatum | A | 2,000 | 100 |
| 3-(2-hydroxy-5-chloro-phenyl) pyrazole | Penicillium notatum | A | 25,000 | 100 |
| Combination of methyl salicylate and 3-(2-hydroxy-5-chloro phenyl) pyrazole. | Penicillium notatum | A | 10,000 60,000 | 20 About 42 |

[1] Nutrient medium A: Bacto-Sabouraud maltose agar (Difco.). Nutrient medium B: Standard I nutrient bouillon Merck 25.0 parts, agar 25.0 parts, glucose 10.0 parts, glycerol 5.0 parts, distilled water ad 1,000 cc. Nutrient medium C: Beer wort agar. Nutrient medium D: Oat flake agar.

It can be seen from the tests described above that the effect of fungicidal compounds on plant pathogenic fungi is increased considerably regardless which nutrient medium is used. As a result thereof fungicidal effects are produced as they were unknown heretofore.

The same surprising synergistic effects as described in Table III are observed when carrying out the tests in the presence of protein as is evident from the following Table IV.

Another advantage of the compositions according to the present invention is their surprisingly low toxicity. The toxicity tests were carried out as follows:

Test animal: White mouse.
Administration: Orally (suspension of the antifungal agent in gum arabic, or, respectively, methyl cellulose gels).
Number of animals tested per dose: 6.
Observation period: 3 days.
Compounds tested:
    (a) methyl salicylate, 3-(2-hydroxy-5-chloro phenyl) pyrazole, methyl ester of p-hydroxy benzoic acid, salicylic acid anilide;
    (b) Combinations of methyl salicylate with
        (1) 3-(2-hydroxy-5-chloro phenyl)pyrazole,
        (2) Methyl ester of p-hydroxy benzoic acid,
        (3) Salicylic acid anilide.

Each of the four components were administered orally by way of a stomach sound in doses of 150 mg., 300 mg., 600 mg., 1200 mg., and 2400 mg., per kg. of body weight to 6 test anmials for each dose. Within the test period

TABLE IV

Test Tube Dilution Test With the Addition of 5% Bovine Serum

[Observation period 21 days]

| Test compound | Test fungus | Nutrient medium [1] | Complete inhibition of growth in a concentration of 1:— | Percent of the minimum inhibitory concentration |
|---|---|---|---|---|
| Methyl salicylate | Trichophyton gypseum | B | 3,000 | 100 |
| 3-(2-hydroxy-5-chloro-phenyl) pyrazole | Trichophyton gypseum | B | 200,000 | 100 |
| Combination of methyl salicylate and 3-(2-hydroxy-5-chloro-phenyl) pyrazole. | Trichophyton gypseum | B | 10,000 2,000,000 | 33.3 10 |
| Methyl salicylate | Pseudopeziza tracheiphila | C | 4,000 | 100 |
| 3-(2-hydroxy-5-chloro phenyl) pyrazole | Pseudopeziza tracheiphila | C | 25,000 | 100 |
| Combination of methyl salicylate and 3-(2-hydroxy-5-chloro phenyl) pyrazole. | Pseudopeziza tracheiphila | C | 10,000 100,000 | 40 25 |
| Methyl salicylate | Phytium de baryanum | D | 3,000 | 100 |
| 3-(2-hydroxy-5-chloro phenyl) pyrazole | Phytium de baryanum | D | <10,000 | 100 |
| Combination of methyl salicylate and 3-(2-hydroxy-5-chloro phenyl) pyrazole. | Phytium de baryanum | D | 10,000 25,000 | 33.3 <40 |
| Methyl salicylate | Hemispora stellata | C | 4,000 | 100 |
| 3-(2-hydroxy-5-chloro phenyl) pyrazole | Hemispora stellata | C | 25,000 | 100 |
| Combination of methyl salicylate and 3-(2-hydroxy-5-chloro phenyl )pyrazole. | Hemispora stellata | C | 10,000 100,000 | 40 25 |

[1] See footnote 1, Table III.

of 3 days no animal died when receiving doses up to 1200 mg./kg. When doses of 2400 mg./kg. were administered, only 3 of 6 test animals in the group treated with methyl salicylate died.

Higher doses were not administered because it is unlikely that higher doses will be of any importance for all practical purposes. Thereby, it is also to be taken into account that, as a rule, compounds which are lethal to animals in a dose exceeding 1000 mg./kg. of body weight, are considered to be substantially non-toxic.

When using combinations of methyl salicylate with each of the above mentioned fungicidal compounds, doses of
    (a) 600 mg./kg. of body weight and
    (b) 1200 mg./kg. of body weight were administered orally by means of an esophageal sound. The above amounts of 600 mg./kg. and 1200 mg./kg. of body weight consist of varying proportions of methyl salicylate and the other antifungal component, namely (1) 1 part of methyl salicylate and 9 parts of the other antifungal agent,
(2) 9 parts of methyl salicylate and 1 part of the other antifungal agent, or
(3) 5 parts of methyl salicylate and 5 parts of the other antifungal agent.

With combinations of methyl salicylate and 3-(2-hydroxy-5-chloro phenyl) pyrazole in the ratios and doses mentioned above none of the treated test animals died.

With combinations of methyl salicylate and the methyl ester of p-hydroxy benzoic acid 2 of 6 animals died when using a dose of 600 mg./kg. of body weight and compositions of the ratios 1:9 and 5:5. When using compositions of the ratio 9:1 in a dose of 1200 mg./kg. of body weight, 2 of 6 test animals died. All other test animals stayed alive. As a result of these tests it can be concluded that only with a relatively high dose of methyl salicylate in the combination with the methyl ester of p-hydroxy benzoic acid some toxic effects are observed.

When using combinations of methyl salicylate with salicylic acid anilide, none of the test animals died within 3 days on administration of doses of 600 mg./kg. and 1200 mg./kg. of body weight regardless what ratio of the two components was used.

According to these acute toxicity tests it can be concluded that the increase in fungicidal activity on combining salicylic acid esters with other fungicidal agents is not due to a corresponding increase in toxicity to warm-blooded animals.

The following examples provide formulas of compositions according to the present invention without, however, being limited thereto.

EXAMPLE 1

Solution: Percent
3-(2-hydroxy-5-chloro phenyl) pyrazole_____ 3.0
4-(N-phenyl-N-benzyl)-amino-1-methyl piperidine lactate_____ 1.0
Methyl salicylate _____ 0.01
Polyoxy ethylene sorbitan monopalmitate known as "Teen 40"_____ 10.0
Isopropanol _____ 40.0
Water, ad 100.0 percent.

EXAMPLE 2

Ointment:
3-(2-hydroxy-5-bromo phenyl)-5-methyl pyrazole _____ 3.0
4-(N-phenyl-N-benzyl)-amino-1-methyl piperidine lactate_____ 1.0
Methyl salicylate_____ 0.05
Anthrasol _____ 2.0
Polyoxy ethylene sorbitan mono-oleate known as "Tween 80"_____ 15.0
Ethanol _____ 10.0
White wax_____ 5.0
Hardened peanut oil_____ 31.0
Water, ad 100.0 percent.

EXAMPLE 3

Powder:
3-(2-hydroxy phenyl) pyrazole_____ 3.0
Methyl salicylate_____ 0.1
Silica of the "Aerosil" type_____ 7.5
Emulsifying wax known as "Lanette N" (Na-ethyl sulfate 10%, ethyl stearyl alcohol 90%)_____ 1.0
Product known as "Cetiol V" (natural oils of animal origin, esters of oleic acid with liquid fatty alcohols)_____ 0.5
Talc, ad 100.0 percent.

EXAMPLE 4

Powder:
3-(2-hydroxy-4-chloro phenyl) pyrazole_____ 2.0
Monoethyleneglycol salicylate_____ 0.2
Silica of the "Aerosil" type_____ 7.5
Emulsifying wax known as "Lanette N" (Na-ethyl sulfate 10%, ethyl stearyl alcohol 90%)_____ 1.0
Product known as "Cetiol V" (natural oils of animal origin, esters of oleic acid with liquid fatty alcohols)_____ 0.5
Talc, ad 100.0 percent.

In the first two formulas 4-(N-phenyl-N-benzyl)- amino-1-methyl piperidine lactate is added as an agent allaying itching.

It is, of course, understood that many changes and variations in the salicylic acid ester employed, the antifungal agent used, the amounts and the proportions of salicylic acid ester and antifungal agent in compositions according to the present application, the mode of application, the composition of the antifungal preparations, and the like may be made by those skilled in the art in accordance with the principles set forth herein and in the claims annexed hereto.

As stated above, the preferred compositions according to the present invention are compositions containing salicylic acid esters and 3-(2-hydroxy phenyl) pyrazole compounds. Such compositions contain preferably about 3% of the pyrazole compound and 0.01% to 0.1% of the salicylic acid ester. Ordinarily, amounts of about 5% of the pyrazole compound and about 1% of the salicylic acid ester should not be exceeded in such preparations.

The preferred compositions according to the present invention which are composed of a salicylic acid ester and a hydroxy phenyl pyrazole, preferably a chloro hydroxy phenyl pyrazole, are also suitable for the treatment of fungus diseases of the skin of humans and animals. The synergistic effect of the components of such compositions is demonstrated on a large number of fungi, especially on pathogenic skin fungi such as *Trichophyton schoenleinii, Trichophyton epilans, Trichophyton gypseum,* and the like as well as on Microsporum species, such as *Microsporum gypseum, Microsporum distortum,* on Epidermophyton species, such as *Epidermophyton floccosum* and *Epidermophyton interdigitale,* on Turolopsis species, such as *Turolopsis candida,* on Blastomyces species, such as *Blastomyces dermatidis* and *Blastomyces brasiliensis,* on Sporotrichum species, such as *Sporotrichum schenckii,* on Aspergillus species, such as *Aspergillus fumigatus* and *Aspergillus niger,* and others.

Due to their broad spectrum of effectiveness a considerable number of fungus diseases of the skin have been successfully treated, for instance, dermatomycoses, such as epidermophytoses, favus, microsporoses, pityriasis, erythrasma, trichophytoses, as well as various forms of moniliasis and sporotrichosis.

The esters of salicylic acid have the highly advantageous property of readily penetrating the skin. They serve, at the same time, as solvents for the other fungicidal component, for instance, for hydroxy phenyl pyrazole and chloro hydroxy pyrazole. Due thereto, the compositions according to the present invention are especially suitable for the treatment of all skin fungus diseases, where a good penetration into the skin is of special importance.

Furthermore, compositions according to the present invention possess properties which render them especially suitable for practical application; such properties are, for instance, their low toxicity against warm-blooded animals.

I claim:
1. An antifungal composition comprising, as antifungal agents, a lower alkyl ester of salicylic acid and 3-(2-hydroxy-5-chloro phenyl) pyrazole.
2. An antifungal composition comprising, as antifungal agents, methyl salicylate and 3-(2-hydroxy-5-chloro phenyl) pyrazole.

3. An antifungal composition comprising, as antifungal agents, between about 0.01% and about 1.0% of methyl salicylate and between about 0.05% and about 5.0% of 3-(2-hydroxy-5-chloro phenyl) pyrazole.

4. An antifungal composition comprising, as antifungal agents, between about 0.01% and about 1.0% of a lower alkyl ester of salicylic acid and between about 0.05% and about 5.0% of 3-(2-hydroxy-5-chloro phenyl) pyrazole.

5. The process of inhibitnig fungal growth consisting in subjecting the fungus growth to the action of a composition comprising, as antifungal agents, methyl salicylate and 3-(2-hydroxy-5-chloro phenyl) pyrazole.

References Cited in the file of this patent

UNITED STATES PATENTS

| 2,721,143 | Kraft et al. | Oct. 18, 1955 |
| 2,764,614 | Meyer | Sept. 25, 1956 |
| 2,802,029 | Schuler | Aug. 6, 1957 |

OTHER REFERENCES

Gross et al.: The Salicylates, Hillhouse Press, New Haven (1948), pages 149–151.

Miller et al.: J.A.M.A., vol. 132, No. 2, September 14, 1946, pages 67–70.

Wadley: The Evidence Required to Show Synergistic Action of Insecticides and a Short Cut in Analysis, U.S. Dept. of Agr. Bulletin ET–223, rec'd February 5, 1947, pages 1–7.

Schuler: German application, Ser. No. Sch 10069, printed September 27, 1956 (K30h 9), 3 pages spec.